(12) United States Patent
Hayashi

(10) Patent No.: US 7,711,508 B2
(45) Date of Patent: May 4, 2010

(54) POSITION DETECTOR

(75) Inventor: Yasukazu Hayashi, Aichi (JP)

(73) Assignee: Okuma Corporation, Aichi (JP)

( * ) Notice: Subject to any disclaimer, the term of this patent is extended or adjusted under 35 U.S.C. 154(b) by 222 days.

(21) Appl. No.: 12/047,893

(22) Filed: Mar. 13, 2008

(65) Prior Publication Data

US 2008/0228423 A1    Sep. 18, 2008

(30) Foreign Application Priority Data

Mar. 16, 2007  (JP) .............................. 2007-068620

(51) Int. Cl.
*G01C 17/38* (2006.01)
(52) U.S. Cl. ....................................................... 702/94
(58) Field of Classification Search .................... 702/94
See application file for complete search history.

(56) References Cited

U.S. PATENT DOCUMENTS

| | | | |
|---|---|---|---|
| 6,564,125 B2 * | 5/2003 | Pattok et al. ................... | 701/29 |
| 6,768,956 B2 | 7/2004 | Hayashi | |
| 7,109,900 B2 * | 9/2006 | Kiriyama et al. ............ | 341/115 |

FOREIGN PATENT DOCUMENTS

| | | |
|---|---|---|
| JP | 4-136715 | 5/1992 |
| JP | 2003-14440 | 1/2003 |
| JP | 2003-35566 | 2/2003 |
| JP | 2005-3672 | 1/2005 |
| JP | 2005-156348 | 6/2005 |
| JP | 2006-112859 | 4/2006 |

OTHER PUBLICATIONS

Office Action for Japanese Application No. 2007-068620, mailed on Apr. 14, 2009 (4 pages).
esp@cenet patent abstract for Japanese Publication No. 2006112859, Publication date Apr. 27, 2006 (1 page).
esp@cenet patent abstract for Japanese Publication No. 2003035566, Publication date Feb. 7, 2003 (1 page).
esp@cenet patent abstract for Japanese Publication No. 20050003672, Publication date Jan. 6, 2005 (1 page).
esp@cenet patent abstract for Japanese Publication No. 2003014440, Publication date Jan. 15, 2003 (1 page).
esp@cenet patent abstract for Japanese Publication No. 4136715, Publication date May 11, 1992 (1 page).
esp@cenet patent abstract for Japanese Publication No. 2005156348, Publication date Jun. 16, 2005 (1 page).

* cited by examiner

*Primary Examiner*—Aditya Bhat
(74) *Attorney, Agent, or Firm*—Osha • Liang LLP

(57) ABSTRACT

Two position sensors provide, as outputs, two signals that vary sinusoidally at a pitch of wavelength λ with respect to a displacement of a target and have phases shifted from each other by 90°. A memory unit has stored therein offset values for the two signals, and two subtractors eliminate the offset values from the two signals, respectively. The two signals after offset elimination are converted into position data in an interpolation calculator. A radius calculator calculates a radius value of the two signals after offset elimination. An FFT calculates offset values based on the position data and the radius values, and the calculated offset values are used to update the values stored in the memory unit. An amplitude ratio correction value and a phase difference correction value for the two signals are updated similarly. By performing elimination of the components that degrade interpolation accuracy at every rotational position, interpolation accuracy is improved.

10 Claims, 2 Drawing Sheets

POSITION DETECTOR

PRIORITY INFORMATION

This application claims priority to Japanese Patent Application No. 2007-068620 filed on Mar. 16, 2007, which is incorporated herein by reference in its entirety.

BACKGROUND OF THE INVENTION

1. Field of the Invention

The present invention relates to a position detector that converts, into position information, output signals from a position sensor which outputs two signals that sinusoidally vary at a pitch of wavelength $\lambda$ with respect to a measured displacement and have phases shifted from each other by 90 degrees.

2. Description of the Related Art

At a rotation shaft of a rotary table or the like of a machining tool, a drive scheme achieved by combining a reduction gear such as a worm gear with a servo motor was previously employed. However, drive schemes using reduction gears are disadvantageous in that accuracy degradation occurs due to backlash, and increase of rotational speed is limited. Accordingly, in recent years, a direct motor drive scheme achieved by incorporating a built-in motor to facilitate accomplishing high accuracy and high speed has been employed at the rotation shaft.

In a rotary table or the like of a machining tool, high-accuracy position detectors are conventionally employed for providing feedback in performing position control. In order to increase the position detection accuracy, these position detectors are configured using a position sensor which outputs two signals that sinusoidally vary at a small pitch with respect to a measured displacement and have phases shifted from each other by 90 degrees. Such a position sensor is used because, even when the resolution accuracy (hereinafter referred to as interpolation accuracy) within the pitch obtained by performing interpolation processing with respect to the two signals is poor, as long as the pitch is small, the ratio by which the interpolation accuracy influences the actual position detection accuracy remains small.

However, in this type of position detector, when rotation about the axis is performed at a high speed, the frequency of the output signals becomes excessively high. For this reason, a position detector of this type that can be used at high rotational speeds has not been available. Accordingly, the rotation shafts driven by the direct motor drive scheme which facilitates high-speed rotation were subjected to restraints in high-speed performance by the position detectors available.

In light of this background, there has been a need for position detectors capable of enhancing the interpolation accuracy even when a position sensor that outputs signals having long pitches in response to a measured displacement is used. Position detectors of this type are disclosed in JP 4-136715 A, JP 2003-14440 A, JP 2005-156348 A, and the like.

SUMMARY OF THE INVENTION

According to the present invention, components that degrade the interpolation accuracy such as an offset, phase difference, and amplitude ratio are quantitatively determined based on a value obtained by performing a Fourier analysis with respect to a change in an amount corresponding to the radius value of a Lissajous circle which is a root-sum-square of the two signals that sinusoidally vary at a pitch of wavelength $\lambda$ with respect to a measured displacement and have phases shifted from each other by 90 degrees. As a result of performing numerical analysis using a spreadsheet tool and the like regarding the change in the radius value occurring under the presence of components that degrade the interpolation accuracy such as an offset, phase difference, and amplitude ratio, it was found that the change occurs in an amount that is equivalent to or at least approximately ½ of the amount of the degrading components. Further, it was found that when one of the two signals includes an offset error, the radius value changes in the form of a cosine wave at the wavelength $\lambda$, and when the other of the two signals includes an offset error, the radius value changes sinusoidally at the wavelength $\lambda$. Moreover, it was found that when an amplitude difference exists between the two signals, the radius value changes in the form of a cosine wave at the wavelength $\lambda/2$. It was also found that when a phase difference exists between the two signals, the radius value changes sinusoidally at the wavelength $\lambda/2$. In addition, it was found that when one of the two signals includes a second order harmonic distortion, the radius value changes in the form of two sine waves having identical amplitudes and wavelengths of $\lambda$ and $\lambda/3$, respectively, and when the other of the two signals includes a second order harmonic distortion component, the radius value changes in the form of two cosine waves having identical amplitudes and wavelengths of $\lambda$ and $\lambda/3$, respectively. It is apparent that the change in the radius value occurs as variation much smaller compared to the amount of change of the two signals varying at the pitch of the wavelength $\lambda$.

According to the present invention, components that degrade the interpolation accuracy such as an offset, phase difference, and amplitude ratio, are quantitatively determined based on the radius value that varies by small amounts. Accordingly, even when the measured displacement is only a slight change of $\lambda$ or $\frac{1}{2}\lambda$, the offset, phase difference, and amplitude ratio can be identified accurately. It is therefore possible to precisely determine changes in the offset, phase difference, and amplitude ratio which fluctuate depending on the position, to eliminate those accuracy-degrading components, and to thereby greatly improve the interpolation accuracy. As a result, both high accuracy and high speed can be simultaneously achieved in a position detector.

DESCRIPTION OF THE PREFERRED EMBODIMENTS

Figure 1:
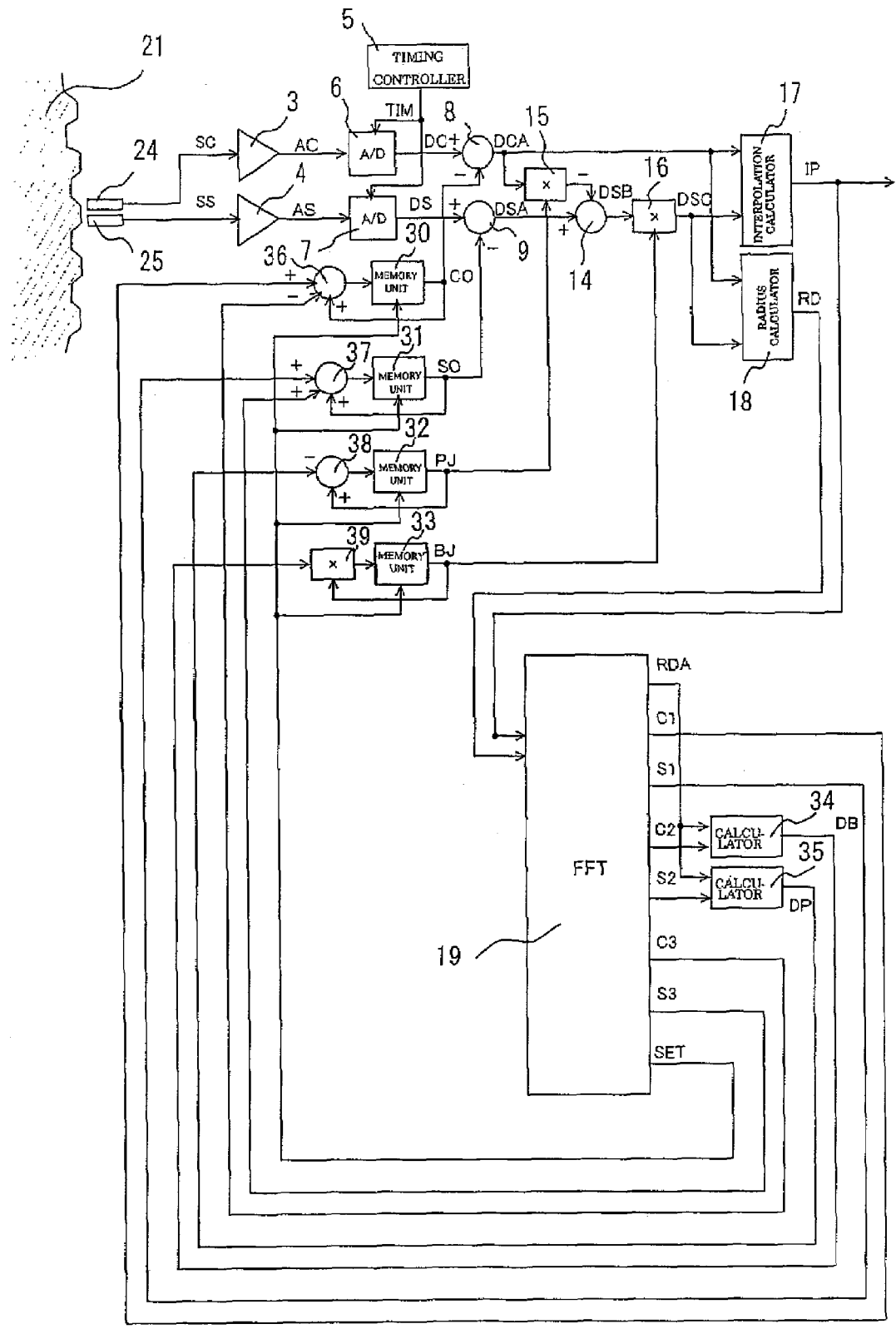
FIG. 1 is a block diagram showing a position detector according to an embodiment of the present invention.

The embodiments of the present invention are described below referring to the drawings.

Figure 2:
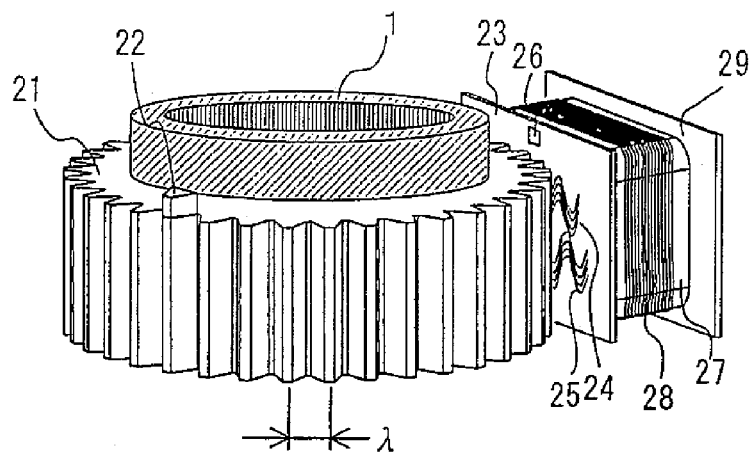
FIG. 2 is a diagram showing a basic structure of a position detector.
Figure 3:
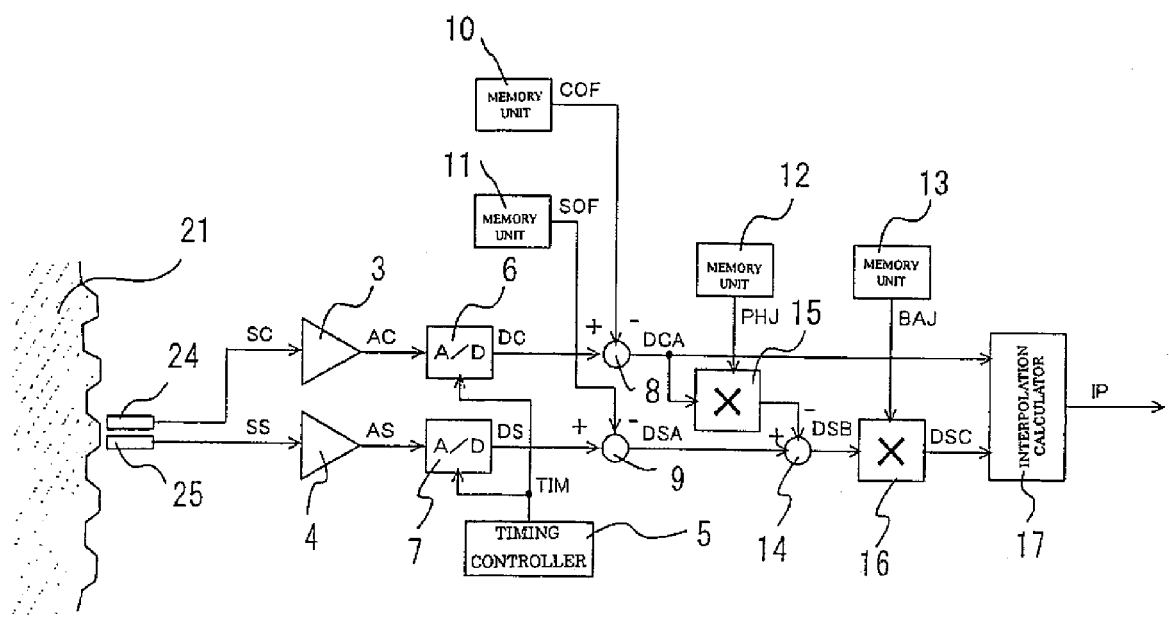
FIG. 3 is a block diagram showing an interpolation operation of a signal processing circuit shown in FIG. 2.

FIG. 2 is a diagram showing a basic structure of a position detector. FIG. 3 is a block diagram showing an interpolation operation of a signal processing circuit 29 in FIG. 2. In FIG. 2, a rotor 21, which is fixed on a rotation shaft 1, is composed of a magnetic member having 36 depressions and projections on its outer periphery in one rotation at the pitch of wavelength $\lambda$=10 degrees. On one projection among the 36 projections of the rotor 21, a protrusion 22 made of a magnetic member for indicating the origin is attached. A printed circuit board 23 mounted on a non-rotating portion of the measurement target (motor) is positioned on a side adjacent to the outer surface of the rotor 21. Formed on the printed circuit board 23 are two types of detection coils 24 and 25 formed of sinusoidal conductive patterns, as well as a detection coil 26 for detecting the protrusion 22 on the rotor 21 for indicating the origin. Further, an electromagnet 27 is provided on the rear side of the printed circuit board 23. When alternating current I×SIN(200000 πt) having the frequency of 100 kHz is made to flow through a magnetizing coil 28, the electromagnet 27 generates alternating magnetizing flux toward the rotor 21 side.

In the position sensor configured as above, when the rotation shaft 1 is rotated, change in reluctance caused by the depressions and projections on the rotor outer periphery serves to change the magnitude of the alternating flux, such that electromotive voltages SC and SS, which are amplitude-modulated to the sine value and the cosine value of rotational displacement θ, respectively, are generated in the detection coils 24 and 25. These signals are input into the signal processing circuit 29, amplified respectively in amplifiers 3 and 4, and output as signals AC and AS. In the example of FIG. 2, the frequency of the magnetizing signal is 100 kHz. Given that the rotation angle of the rotation shaft 1 is θ and that the amplitude of the output signals are G, signals AC and AS can be expressed by Equations 1 and 2 below:

$$AC = G \times COS(36\theta) SIN(200000 \pi t) \quad (1)$$

$$AS = G \times SIN(36\theta) SIN(200000 \pi t) \quad (2)$$

These signals AC and AS are digitized respectively in AD converters 6 and 7 by being sampled at timings such that SIN(200000 πt)=1 holds true, using pulse signal TIM which has a period of 10 μS and is output from a timing controller 5 in synchronization with the magnetizing signal. As a result, signals AC and AS are converted into numerical values DC and DS, which can be expressed by Equations 3 and 4 below:

$$DC = G \times COS(36\theta) \quad (3)$$

$$DS = G \times SIN(36\theta) \quad (4)$$

Based on the above, it can be assumed that the position detection sensor within the position detector shown in FIG. 2 outputs two signal outputs that sinusoidally vary at a pitch of wavelength λ (10 degrees) of the measured displacement and have phases shifted from each other by 90 degrees.

Due to varying installation conditions of the rotor 21 and the detection coils 24, 25 and characteristic variations of the signal amplifiers and the like, the two digitized values DC, DS include offset voltages COF and SOF, as well as phase difference P and amplitude ratio B between the two signals. Accordingly, the above-noted Equations 3 and 4 are more precisely expressed by Equations 5 and 6 below:

$$DC = G \times COS(36\theta) + COF \quad (5)$$

$$DS = B \times G \times SIN(36\theta) + P \times G \times COS(36\theta) + SOF \quad (6)$$

Normally, interpolation accuracy becomes poor when the interpolation processing is performed using the numerical values DC, DS in the form of raw signals as initially obtained. Accordingly, in the position detector of FIG. 2, the offset values COF, SOF, as well as phase correction value PHJ (=P) and amplitude ratio correction value BAJ (=1/B) for correcting the phase difference and the amplitude ratio between the two signals, all of which are included in the numerical values DC and DS, are measured at the time of manufacture of the position detector, stored in a non-volatile memory or the like provided in the position detector, and set in memory units 10, 11, 12, and 13 at the time of turning on power before starting position detection. The offset correction values COF and SOF stored in the memory units 10 and 11 are subtracted from the numerical values DC and DS by subtractors 8 and 9, such that numerical values DCA and DSA are obtained. In subtractor 14, a value obtained by multiplying the phase correction value PHJ stored in the memory unit 12 and the numerical value DCA is subtracted from the numerical value DSA, resulting in numerical value DSB from which the phase error component is removed. Further, in multiplier 16, the numerical value DSB is multiplied by the amplitude ratio correction value BAJ stored in the memory unit 13, resulting in numerical value DSC having an amplitude substantially equal to that of the value DCA. In interpolation calculator 17, the values DCA and DSC are subjected to arctangent calculation using input of two variables, so as to be converted into position signal IP indicating a rotation amount within 1/36 rotation of the rotation shaft 1.

Although not shown in the drawings due to lack of necessity in describing the present invention, in an actual position detector, processing such as count processing based on changes in the position signal IP is carried out in order to obtain position data for at least one or more rotations of the rotation shaft 1, and the obtained data are output to a motor controller or the like. Further, when the protrusion 22 on the rotor 21 indicating the origin passes near the detection coil 26, the count value for 5 incremental processing may be cleared, and after that, rotational positions within one rotation of the rotation shaft 1 may be detected as absolute positions.

Furthermore, by adding a disc having absolute patterns as disclosed in JP 4-136715 to the rotor 21 and providing on the printed circuit board 23 a plurality of coils for reading the absolute patterns, it is possible to detect an absolute position from immediately after activating the detector.

According to the conventional position detector shown in FIG. 2, the interpolation accuracy can be improved to some degree. However, because the offset, phase difference, and amplitude ratio in fact fluctuate depending on the rotational position, further improvement of the interpolation accuracy using constant correction values is extremely difficult. Meanwhile, by employing the technique disclosed in JP 2003-14440A and the like, it is possible to identify, to some degree, correction variables COF, SOF, PHJ, and BAJ that vary depending on the rotational position, such that the interpolation accuracy can be somewhat further enhanced using those variables. However, according to the technique of JP 2003-14440A, because the correction variables are identified based on changes in the numerical value DC or DS which varies significantly within the wavelength λ of the rotational position, in order to increase the identification accuracy, it is necessary to eliminate the fundamental component that varies significantly at the wavelength of λ. In this regard, it is necessary to remove the fundamental component by taking an average over rotational displacement for several times the wavelength λ. As such, this technique is insufficient for highly accurately identifying the correction variables during a small rotational displacement.

In contrast, in a position detector according to an embodiment of the present invention, components that degrade the interpolation accuracy, which are included in the two signals that vary sinusoidally at a pitch of wavelength λ with respect to a measured displacement and have phases shifted from each other by 90 degrees, are accurately identified for every rotational position, and these degrading components are removed at every rotational position. Accordingly, the interpolation accuracy can be increased, thereby making it possible to simultaneously achieve both high accuracy and high speed in the position detector.

FIG. 1 is a block diagram showing an embodiment of the present invention. In FIG. 1, blocks having functions identical to those in FIG. 3 are labeled with the same reference numerals, and explanations of those blocks will not be repeated.

In FIG. 1, the numerical values DCA and DSC after elimination of offset, phase difference, and amplitude ratio are subjected to calculation shown in Equation 7 below in a radius calculator 18, and radius value RD is output.

$$RD = SQRT(DCA\textasciicircum 2 + DCC\textasciicircum 2) \quad (7)$$

Here, SQRT denotes square root, and ^2 denotes square.

In a fast Fourier transform (FFT) 19, the radius value RD output from the radius calculator 18 is subjected to fast Fourier calculation at every instance that the rotational position is changed by λ, using the interpolation value IP output from the interpolation calculator 17. In the FFT 19, a value corresponding to radius value RD for every positional change by $\frac{1}{2}^n$ of the wavelength λ of positional signal IP (where n is an integer greater than or equal to 3) is calculated by means of averaging and interpolation processing. Further, the resulting $2^N$ number of radius values RDs are subjected to elimination of tilt change component, and then subjected to fast Fourier calculation for calculating the first- to third-order components. As a result of this Fourier analysis, the FFT 19 outputs: the cosine component and sine component having wavelength λ, corresponding to the first-order components, as C1 and S1; the cosine component and sine component having wavelength λ/2, corresponding to the second-order components, as C2 and S2; and the cosine component and sine component having wavelength λ/3, corresponding to the third-order components, as C3 and S3. The FFT 19 also calculates the average radius of the RD values at every occurrence of rotational position change by λ, and outputs the calculated value as numerical value RDA. Upon completion of the fast Fourier calculation executed at every occurrence of rotational position change by λ, the FFT 19 outputs a store command signal SET to memory units 30, 31, 32, and 33.

In calculator 36, numerical value CO that is stored in memory unit 30 and used for eliminating the offset component from the numerical value DC is added together with the numerical value C1 which is the cosine component of wavelength λ of radius value RD calculated in the FFT 19, and further, the numerical value C3 which is the cosine component of wavelength λ/3 is subtracted. The value thus calculated in the calculator 36 is stored in the memory unit 30 upon receipt of the store command signal SET from the FFT 19, and is used as the offset correction value for the numerical value DC. In calculator 37, numerical value SO that is stored in memory unit 31 and used for eliminating the offset component from the numerical value DS is added together with the numerical value S1 which is the sine component of wavelength λ of radius value RD calculated in the FFT 19, and the numerical value S3 which is the sine component of wavelength λ/3 is further added. The value thus calculated in the calculator 37 is stored in the memory unit 31 upon receipt of the store command signal SET from the FFT 19, and is used as the offset correction value for the numerical value DS.

Using the above-described arrangement, it is possible to accurately identify, during a rotational change by wavelength λ only, the offset components of the numerical values DC and DS, and to eliminate the identified components from the numerical values DC and DS. When the second-order harmonic components are included in the numerical values DC and DS by only a small amount, it is not necessary to perform the correction using the offset components according to the components having wavelength λ/3. Further, in principle, it is possible to perform the offset component identification as described above not only for a rotational change by wavelength λ but also for a rotational change by an integer multiple of wavelength λ.

In calculator 35, calculation according to Equation 8 below is performed with respect to the numerical value S2 which is the sine component of wavelength λ/2 of radius value RD calculated in the FFT 19 and the numerical value RDA which is the average radius, resulting in outputting numerical value DP.

$$DP = 2 \times S2/RDA \quad (8)$$

In subtractor 38, the numerical value DP output by the calculator 35 is subtracted from numerical value PJ that is stored in the memory 32 for use for eliminating the phase difference included in the numerical value DSA. The numerical value obtained as a result of the subtraction by the subtractor 38 is stored in the memory unit 32 upon receipt of the store command signal SET from the FFT, and is used as the phase difference correction value for the numerical value DSA.

According to the above arrangement, it is possible to accurately identify, during a rotational change by wavelength λ only, how much the phase difference of the numerical value DSA with respect to the numerical value DCA is deviated from 90 degrees, i.e., to accurately identify the components in the numerical value DSA that are in phase with the numerical value DCA, and to eliminate the identified components from the numerical values DSA. While the phase difference is identified for each rotational change by wavelength λ in the above embodiment, in principle, it is possible to identify the phase difference component not only for a rotational change by λ but also for a rotational change by an integer multiple of λ/2.

In calculator 34, calculation according to Equation 9 below is performed with respect to the numerical value C2 which is the cosine component of wavelength λ/2 of radius value RD calculated in the FFT 19 and the numerical value RDA which is the average radius, resulting in outputting numerical value DB.

$$DB = (RDA + C2)/(RDA - C2) \quad (9)$$

In multiplier 39, numerical value BJ that is stored in the memory 33 for use for eliminating the amplitude ratio of the numerical value DSB is multiplied by the numerical value DB output by the calculator 34. The numerical value obtained as a result of the multiplication by the multiplier 39 is stored in the memory unit 33 upon receipt of the store command signal SET from the FFT, and is used as the amplitude ratio correction value for the numerical value DSB.

According to the above arrangement, it is possible to accurately identify, during a rotational change by wavelength λ only, the amount by which the amplitude ratio of the numerical value DSB with respect to the numerical value DSA differs from one, and to eliminate the identified amount from the numerical values DSB. While the amount of amplitude ratio degradation is identified for each rotational change by wavelength λ in the above embodiment, in principle, it is possible to identify the amount of amplitude ratio degradation not only for a rotational change by λ but also for a rotational change by an integer multiple of λ/2.

What is claimed is:

1. A position detector for detecting a displacement of a target, comprising:

a position sensor that outputs two signals that sinusoidally vary at a pitch of wavelength λ with respect to the displacement and have phases shifted from each other by 90 degrees;

an offset memory that stores offset values regarding the two signals output from the position sensor;

an offset elimination circuit that eliminates the offset values stored in the offset memory from the respective two signals output from the position sensor;

an interpolation calculator that converts the two signals after the offset elimination into position data;

a radius calculator that calculates a root-sum-square of the two signals after the offset elimination; and an offset value calculator that calculates offset values to be stored in the offset memory based on the position data and an output value from the radius calculator which are obtained when the measured displacement is changed by an integer multiple of wavelength λ;

wherein the offset values stored in the offset memory are updated using the offset values obtained in the offset value calculator.

2. The position detector as defined in claim 1, wherein the offset value calculator calculates the offset values based on a component having wavelength λ obtained by performing a Fourier analysis with respect to a change in the output value of the radius calculator.

3. The position detector as defined in claim 1, wherein the offset value calculator calculates the offset values based on a component having wavelength λ and a component having wavelength λ/3 which are obtained by performing a Fourier analysis with respect to a change in the output value of the radius calculator.

4. The position detector as defined in claim 1, further comprising:

an amplitude ratio correction value memory that stores an amplitude ratio correction value regarding the two signals output from the position sensor; and an amplitude ratio correction value calculator that calculates an amplitude ratio correction value to be stored in the amplitude ratio correction value memory based on the position data and an output value from the radius calculator which are obtained when the measured displacement is changed by an integer multiple of wavelength λ/2;

wherein the amplitude ratio correction value stored in the amplitude ratio correction value memory is updated using the amplitude ratio correction value obtained in the amplitude ratio correction value calculator.

5. The position detector as defined in claim 4, further comprising:

a phase difference correction value memory that stores a phase difference correction value regarding the two signals output from the position sensor; and a phase difference correction value calculator that calculates a phase difference correction value to be stored in the phase difference correction value memory based on the position data and an output value from the radius calculator which are obtained when the measured displacement is changed by an integer multiple of wavelength λ/2;

wherein the phase difference correction value stored in the phase difference correction value memory is updated using the phase difference correction value obtained in the phase difference correction value calculator.

6. The position detector as defined in claim 1, further comprising:

a phase difference correction value memory that stores a phase difference correction value regarding the two signals output from the position sensor; and a phase difference correction value calculator that calculates a phase difference correction value to be stored in the phase difference correction value memory based on the position data and an output value from the radius calculator which are obtained when the measured displacement is changed by an integer multiple of wavelength λ/2;

wherein the phase difference correction value stored in the phase difference correction value memory is updated using the phase difference correction value obtained in the phase difference correction value calculator.

7. A position detector for detecting a displacement of a target, comprising:

a position sensor that outputs two signals that sinusoidally vary at a pitch of wavelength λ with respect to the displacement and have phases shifted from each other by 90 degrees;

an amplitude ratio correction value memory that stores an amplitude ratio correction value regarding the two signals output from the position sensor; and an amplitude ratio correction circuit that corrects an amplitude ratio of the two signals output from the position sensor in accordance with the amplitude ratio correction value stored in the amplitude ratio correction value memory;

an interpolation calculator that converts the two signals after the amplitude ratio correction into position data;

a radius calculator that calculates a root-sum-square of the two signals after the amplitude ratio correction; and an amplitude ratio correction value calculator that calculates an amplitude ratio correction value to be stored in the amplitude ratio correction value memory based on the position data and an output value from the radius calculator which are obtained when the measured displacement is changed by an integer multiple of wavelength λ/2;

wherein the amplitude ratio correction value stored in the amplitude ratio correction value memory is updated using the amplitude ratio correction value obtained in the amplitude ratio correction value calculator.

8. The position detector as defined in claim 7, wherein the amplitude ratio correction value calculator calculates the amplitude ratio correction value based on a component having wavelength λ/2 obtained by performing a Fourier analysis with respect to a change in the output value of the radius calculator with respect to the position data.

9. A position detector for detecting a displacement of a target, comprising:

a position sensor that outputs two signals that vary sinusoidally at a pitch of wavelength λ with respect to the displacement and have phases shifted from each other by 90 degrees;

a phase difference correction value memory that stores a phase difference correction value regarding the two signals output from the position sensor; and a phase difference correction circuit that corrects a phase difference of the two signals output from the position sensor in accordance with the phase difference correction value stored in the phase difference correction value memory;

an interpolation calculator that converts the two signals after the phase difference correction into position data;

a radius calculator that calculates a root-sum-square of the two signals after the phase difference correction; and a phase difference correction value calculator that calculates a phase difference correction value to be stored in the phase difference correction value memory based on the position data and an output value from the radius calculator which are obtained when the measured displacement is changed by an integer multiple of wavelength $\lambda/2$;

wherein the phase difference correction value stored in the phase difference correction value memory is updated using the phase difference correction value obtained in the phase difference correction value calculator.

10. The position detector as defined in claim 9, wherein the phase difference correction value calculator calculates the phase difference correction value based on a component having wavelength $\lambda/2$ obtained by performing a Fourier analysis with respect to a change in the output value of the radius calculator with respect to the position data.

* * * * *